US011625184B1

(12) United States Patent
Hasegawa et al.

(10) Patent No.: US 11,625,184 B1
(45) Date of Patent: Apr. 11, 2023

(54) RECALLING FILES FROM TAPE

(71) Applicant: International Business Machines Corporation, Armonk, NY (US)

(72) Inventors: Tohru Hasegawa, Tokyo (JP); Tsuyoshi Miyamura, Yokohama (JP); Hiroshi Itagaki, Yokohama (JP); Atsushi Abe, Ebina (JP); Noriko Yamamoto, Tokyo (JP); Shinsuke Mitsuma, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/478,000

(22) Filed: Sep. 17, 2021

(51) Int. Cl.
*G06F 3/06* (2006.01)
*G11B 5/008* (2006.01)

(52) U.S. Cl.
CPC .......... *G06F 3/0647* (2013.01); *G06F 3/0604* (2013.01); *G06F 3/0682* (2013.01); *G06F 3/0685* (2013.01); *G11B 5/00813* (2013.01)

(58) Field of Classification Search
CPC .... G06F 3/0604; G06F 3/0647; G06F 3/0682; G06F 3/0685; G06F 3/0686; G11B 5/00813
USPC ........................................................ 711/111
See application file for complete search history.

(56) References Cited

U.S. PATENT DOCUMENTS

| 8,055,724 B2 * | 11/2011 | Amegadzie ........... G06F 16/185 709/217 |
| 8,856,073 B2 * | 10/2014 | Matsuzawa ............. G06F 3/067 707/622 |
| 9,830,085 B1 | 11/2017 | Hasegawa et al. |
| 10,042,556 B2 | 8/2018 | Hasegawa et al. |
| 10,620,838 B2 | 4/2020 | Hasegawa et al. |
| 11,210,168 B1 * | 12/2021 | Lam ...................... G06F 11/203 |
| 11,442,897 B2 * | 9/2022 | Bramante ................. G06F 7/00 |
| 2011/0040729 A1 * | 2/2011 | Ito .......................... G06F 16/185 711/E12.001 |
| 2011/0167045 A1 * | 7/2011 | Okamoto ............ G06F 16/1824 707/661 |
| 2012/0179868 A1 * | 7/2012 | Haustein ............. G06F 12/0253 711/111 |
| 2017/0031603 A1 | 2/2017 | Hasegawa et al. |
| 2017/0295219 A1 * | 10/2017 | Sarkar ..................... G16H 10/60 |
| 2017/0357451 A1 | 12/2017 | Hasegawa et al. |
| 2017/0371887 A1 * | 12/2017 | Balasubramanian ....................... G06F 16/119 |
| 2018/0059959 A1 | 3/2018 | Hasegawa et al. |
| 2018/0059960 A1 | 3/2018 | Hasegawa et al. |
| 2018/0059961 A1 | 3/2018 | Hasegawa et al. |

(Continued)

OTHER PUBLICATIONS

D. Pease, A. Amir, L. V. Real, B. Biskeborn, M. Richmond and A. Abe, "The Linear Tape File System," 2010 IEEE 26th Symposium on Mass Storage Systems and Technologies (MSST), 2010, pp. 1-8, doi: 10.1109/MSST.2010.5496989. (Year: 2010).*

*Primary Examiner* — Reginald G Bragdon
*Assistant Examiner* — Aaron D Ho
(74) *Attorney, Agent, or Firm* — Donald J. O'Brien

(57) ABSTRACT

Embodiments are disclosed for a method. The method includes migrating a file to a newer tape. The file is previously recalled by a linear tape file system (LTFS) from an older tape. The method also includes updating a stub for the file with metadata describing the newer tape, the older tape, and the file. Further, the method includes recalling the file using a tape selected from a plurality of potential tapes identified by the metadata.

18 Claims, 6 Drawing Sheets

(56) References Cited

U.S. PATENT DOCUMENTS

2018/0260133 A1  9/2018 Hasegawa et al.
2019/0361622 A1* 11/2019 Hasegawa ............... G06F 16/18
2020/0026784 A1  1/2020 Miyoshi et al.
2020/0326872 A1 10/2020 Miyoshi et al.

* cited by examiner

RECALLING FILES FROM TAPE

BACKGROUND

The present disclosure relates to recalling files, and more specifically, to recalling files from tape.

In some computer systems, a linear tape file system (LTFS) can provide access to files stored on tape cartridges through an interface of the file system. The LTFS can store data on a tape cartridge in a form according to the LTFS format, which is an open-source specification, and implemented by many vendors.

SUMMARY

Embodiments are disclosed for a method. The method includes migrating a file to a newer tape. The file is previously recalled by a linear tape file system (LTFS) from an older tape. The method also includes updating a stub for the file with metadata describing the newer tape, the older tape, and the file. Further, the method includes recalling the file using a tape selected from a plurality of potential tapes identified by the metadata.

Further aspects of the present disclosure are directed toward systems and computer program products with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
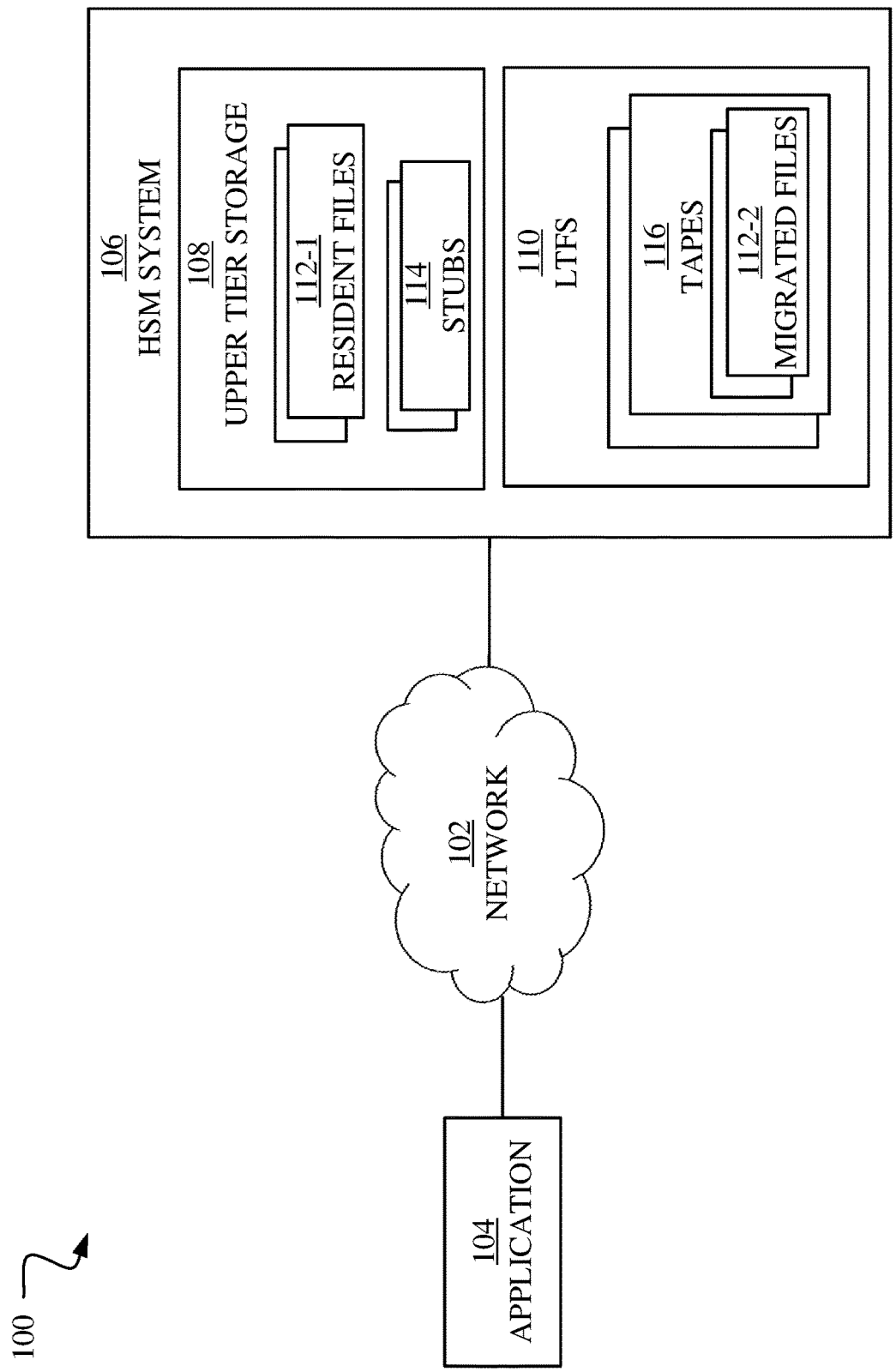
FIG. 1 is a block diagram of an example system for recalling files from tape, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

As stated previously, a linear tape file system (LTFS) can provide access to files stored on tape cartridges. However, an LTFS can have more latency than a hard disk drive storage (HDD). Thus, an application configured to run with hard disk drives (HDD) can run continuously without time-out errors, which can make applications terminate abnormally. Operating systems and/or operators may restart, or replace, such applications, which makes the application and these systems less efficient. Further, when an application configured to execute with HDD storage instead uses a tape system, such as an LTFS, it may take a relatively long time to access a file stored on a tape. The latency of a data access can depend on the physical, stored position of the file, and thus, can cause time-out errors for the application.

To reduce the frequency of such errors, a hierarchical storage management (HSM) system may divide storage between upper and lower tiers, with the upper tier having relatively high-speed storage, such as HDD and solid state disk (SSD). The lower tier may have relatively lower-speed storage, such as an LTFS. Accordingly, the HSM can use upper tier storage for files being accessed by active applications, and the lower tier for files with less frequent access. In this way, applications may run more efficiently, and incur fewer fatal time-out errors.

FIG. 1 is a block diagram of an example system 100 for recalling files from tape, in accordance with some embodiments of the present disclosure. The system 100 includes a network 102, application 104, and hierarchical storage management (HSM) system 106. The network 102 may be a local area network, wide area network, or collection of computer communication networks that facilitates communication between components of the system 100, specifically, between the application 104 and HSM system 106. In some embodiments, the network 102 can be the Internet.

The application 104 can be a computer program running on a computer host that performs a particular function or set of functions. Additionally, the application 104 can read and write data to and from data storage in performing these functions. More specifically, the application 104 can send requests to the HSM system 106 to read and/or write data storage.

The HSM system 106 can be a data storage management system that uses multiple tiers of storage to increase the efficiency of data storage use. More specifically, the HSM system 106 can include an upper tier storage 108 and an LTFS 110. The HSM system 106 can use upper tier storage 108 for data that is accessed relatively frequently. Accordingly, the upper tier storage 108 can include relatively fast storage devices, such as high density disk (HDD), solid state, and/or flash drives. In contrast, the LTFS 110 may be relatively slower than the upper tier storage 108, and can include storage devices, such as magnetic tape cartridges. Accordingly, the HSM system 106 can use the LTFS 110 for data that is accessed relatively infrequently. In this way, the HSM system 106 can provide data access with relatively low latency for data that is accessed relatively frequently from the upper tier storage 108. In contrast, while the LTFS 110 can have higher latency than the upper tier storage 108, because the data in LTFS 110 is accessed less frequently than data in upper tier storage, the latency may not incur as much of a cost.

Additionally, the upper tier storage 108 can include resident files 112-1 and stubs 114. The resident files 112-1 may represent a relatively newer dataset that the application 104 creates, for example. The resident files 112-1 may reside in HDD for relatively quicker data accesses from the application 104. In this way, the HSM system 106 may use HDD as an upper tier storage 108 for the application 104 to store data in HDD. The HSM system 106 may manage the upper tier storage 108 and the LTFS 110 by using the upper tier for more frequently accessed data, and the lower tier for less frequently accessed data.

Accordingly, the HSM system 106 may periodically, move data between the upper and lower tiers based on one or more policies. For example, the HSM system 106 may implement a policy such as, "move a file with no access for a certain period at night to tape." In other words, the HSM system 106 may move resident files 112-1 in HDD (e.g., without the threshold amount of access) to a tape 116 of the LTFS 110. Herein, movement of a file from the upper tier storage 108 to the LTFS 110 is referred to as migration. When migrating a resident file 112-1 from the upper tier storage 108, the LTFS 110 can move data from the resident file 112-1 to a migrated file 112-2 on one of the tapes 116. Herein, the resident file 112-1 and migrated file 112-2 are also referred to individually as file 112 (and collectively as files 112). Additionally, the HSM system 106 can create the stub 114.

The stub 114 can be a shell of a file that contains metadata, not the file data that the application 104 is reading and writing. This metadata may include an identifier (ID) of the destination tape, i.e., the tape 116 storing the migrated file 112-2. Once migrated, the application 104 can still access the data by making a request to the LTFS 110 to retrieve the file from tape 116. Herein, movement of a file from tape 116 to the upper tier storage 108 is referred to as a recall. The application 104 may trigger a recall of a migrated file 112-2 from tape 116 by performing a read of data in the migrated file 112-2. The LTFS 110 may read the tape ID from the stub 114 for the migrated file 112-2, retrieve the identified tape, and copy the migrated file 112-2 to a resident file 112-1 (e.g., in HDD). In this way, the HSM system 106 may make the data of the file 112 more readily available to the application 104. Herein, the metadata including the ID of the destination tape is referred to as migrated tape information.

As an object of migrating and recalling, each file 112 may transition between different states. More specifically, there may be three file states with respect to migration and recall: resident, pre-migrated, and migrated. A resident state may mean that the file 112 exists in the upper tier storage 108 and is not stored on tape 116. A pre-migrated state may mean that the file 112 exists in the upper tier storage 108 and is copied to tape 116. A migrated state means that the file 112 is stored in the upper tier storage 108, is stubbed, and copied to tape 116. Being stubbed can mean the LTFS 110 has created a stub 114 for the file, as described previously.

Further, there may be scenarios wherein both upper tier storage 108 and LTFS 110 include files 112 in intermediate states. For example, the recall of a migrated file 112-1 can lead to a pre-migrated state. However, the HSM system 106 may bypass a resident state and return to a migrated state after a predetermined period of time (depending on the usage of the upper tier storage 108). For example, the LTFS 110 may change the file 112 from migrated to resident directly when the file is recalled. Alternatively, the LTFS 110 may change the file 112 from a pre-migrated state to a resident state after a short time. Further, the LTFS 110 may change the file 112 from resident to migrated after a predetermined period of time. In such a scenario, the LTFS 110 may write the file 112 to another place on tape 116. Thus, if the file 112 is read again, the LTFS 110 may change the file 112 from a migrated state to resident. The file would be written to the other tape after a predetermined period of time. Moving a migrated file to a pre-migrated state in this way can derive from an empirical rule in the operation of the HSM system 106 wherein a file 112 accessed once is likely to be accessed again within a relatively short period of time.

However, when recalling a file 112, if the tape 116 storing the file 112 is not mounted on a tape drive, the LTFS 110 may retrieve the tape 116 (e.g., mount the tape 116 on a tape drive). Thus, when recalling several files 112, the LTFS 110 may result in mounting multiple tapes 116 in order to recall the files 112. As such, when multiple migrated files 112-2 are likely to be read collectively, it may be useful to store these migrated files 112-2 on the same tape 116 to reduce the number of tape mounts, and thus, the time it takes to recall and read the files 112.

Tape drives read and write data in specific formats, using prescribed protocols. As the ability to pack data onto tapes 116 more densely, these formats adapt in successive generations of computer hardware and software. For example, first-generation linear tape open (LTO) tape drive products were released after the year 2000 at intervals of every few years, and eighth-generation products are more current. LTO tape drives support reading and writing tape media that is written in a format of one generation before the current generation. Additionally, LTO tape drives can support reading of tape media written in a format of two generations before the latest generation. However, LTO tape drives may be unable to read/write tape media written in a format of older generations beyond these thresholds. Therefore, to store data for a relatively long period (e.g., 10 years or more), the LTFS 110 may perform a reclaim operation to read a file 112 stored in the older generation tape medium, and copy the file 112 to a relatively more current generation tape medium. Accordingly, the reclaim operation may specify a tape 116 as a source to be reclaimed.

To reduce the time spent on reclaim operations, the LTFS 110 may automatically migrate files 112 when recalling such files 112 from older generation tapes. For example, upon a recall of a file 112 stored on an older tape, the LTFS 110 may put the file 112 in a resident state and migrate the file 112 to a newer generation tape. When recalling files 112 in this way, the LTFS 110 may not delete the files 112 from the older tape. Instead, the LTFS, for example, may delete the migrated tape information from the stub 114 in order to eliminate association between the file 112 on the older tape 116 and the respective resident file 112-1. In this way, the LTFS 110 may reduce the number of explicitly executed reclaim operations, and the associated time involved.

However, automatically migrating files 112 in this way, may lead to more tape mounts for future recall operations. The reason for this increase may be that the files 112 on the older tapes may still store valid file data. In fact, days or months may pass before disposing of the older tape (disposing can involve re-formatting the tapes in newer generation protocols.) Because so much time can pass, if the LTFS 110 could identify the older tape, the LTFS 110 may use one of two potential tapes 116 for recalling the file 112. Having multiple tapes 116 to choose from may make it easier for the HSM system 106 to reduce the number of tape mounts in recalling multiple files 112. However, as stated previously, the metadata for the older tape may be deleted. As such, even though a file 112 may still be stored on an older tape, only the identifier of a newer tape may be recorded in the migrated tape information of the corresponding stub 114. As such, the LTFS 110 may not be able to find the older tape to use for the recall.

Accordingly, in some embodiments of the present disclosure, the LTFS 110 can reduce the number of tape mounts for recall operations by storing metadata in the stubs 114 that identifies two potential tapes for the recall: the current tape, holding the copy of the file from the most recent migration (e.g., newer tape); and a source tape of a reclaim operation that created the current tape (e.g., the older tape). The LTFS 110 can determine if file 112 on the source tape is still available. If so, the LTFS 110 may perform the recall using the source tape, if so doing reduces potential tape mounts associated with the recall.

In this way, the LTFS 110 may improve the operation of lower tier storage, reduce wear on tapes 116 and tape drives, improve the efficiency of the applications 104 and various computer processing and/or other systems that use tape drives. The LTFS 110 may achieve these advantages by reducing the number of tape mounts that the LTFS 110 performs during recall operations.

Figure 2:
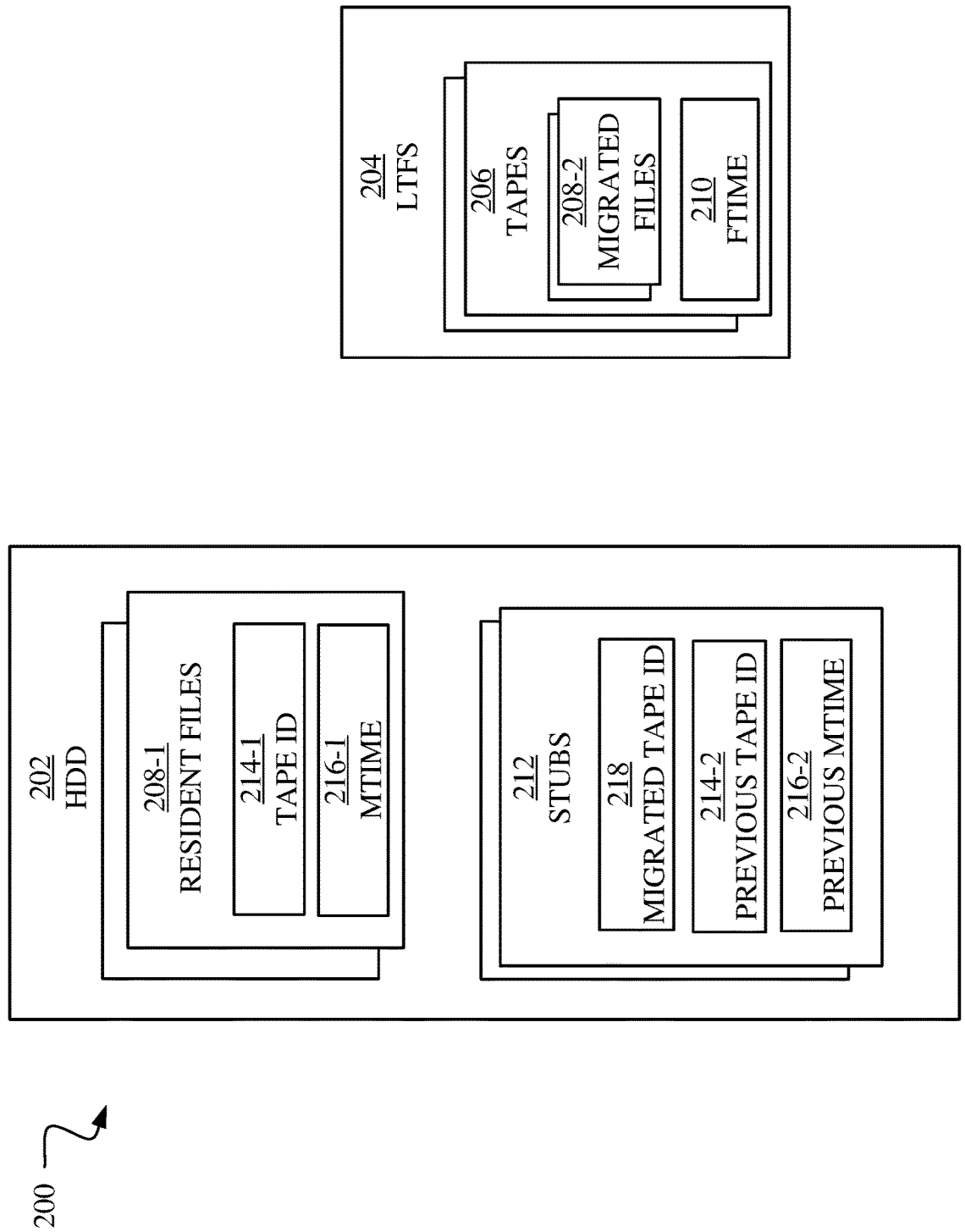
FIG. 2 is a block diagram of an example hard disk drive (HDD) and linear tape file system (LTFS), in accordance with some embodiments of the present disclosure.

FIG. 2 is a block diagram of an example HDD 202 and LTFS 204, in accordance with some embodiments of the present disclosure. As stated previously, an HDD and LTFS, such as the HDD 202 and LTFS 204 can represent respective examples of upper tier storage 108, and LTFS 110, as described with respect to FIG. 1. The LTFS 204 includes tapes 206, which are similar to the tapes 116. The tapes 206 include migrated files 208-2, which are similar to the migrated files 112-2. Additionally, the tapes 206 can include a formatted time (FTIME) 210. When the LTFS 204 formats a tape 206, the LTFS 204 may store a timestamp obtained at the time of formatting as an extended attribute of the tape 206. Accordingly, the FTIME 210 can represent this timestamp indicating when the tape 206 was formatted. The LTFS 204 can store the FTIME 210 for each tape 206 in extended attributes, which the LTFS 204 can read without a tape mount. Rather, the LTFS 204 may store the FTIME 210 in a local cache.

In this example, the HDD 202 includes resident files 208-1 and stubs 212, which are respectively similar to the resident files 112-1 and stubs 114. The resident files 208-1 can include metadata, specifically, tape ID 214-1, and migration time (MTIME) 216-1. The MTIME 216-1 can represent a time when the file 208 was last modified (e.g., at the time of migration). As stated previously, when the LTFS 204 recalls a file 208, the LTFS 204 places the file 208 into a resident state, (e.g., creating the resident file 208-1). Herein, the resident files 208-1 and migrated files 208-2 are also referred to individually as file 208, and collectively as files 208.

Further, according to some embodiments of the present disclosure, the LTFS 204 may store the migrated tape info and a timestamp in the metadata of the resident file 208-1. More specifically, the LTFS 204 may copy the ID of the recalled tape to the tape ID 214-1, and store the MTIME 216-1. As stated previously, the MTIME 216-1 may indicate when the file 208 was last modified (e.g., when the file 208 was migrated).

Accordingly, when the file 208 is migrated again, the LTFS 204 may copy the metadata from the resident file 208-1 to its corresponding stub 212. More specifically, the LTFS 204 may copy the tape ID 214-1 to the previous tape ID 214-2, and copy the MTIME 216-1 to the previous MTIME 216-2. Additionally, the LTFS 204 may store the ID of the destination tape of the migration in the migrated tape ID 218. In this way, the LTFS 204 may populate the stub 212 with information that is useful for recalling the file 208 from potentially more than one tape 206. More specifically, the migrated tape ID 218 can identify the newer tape storing the file 208, and the previous tape ID 214-2 can identify the older tape storing the file 208.

Figure 3:
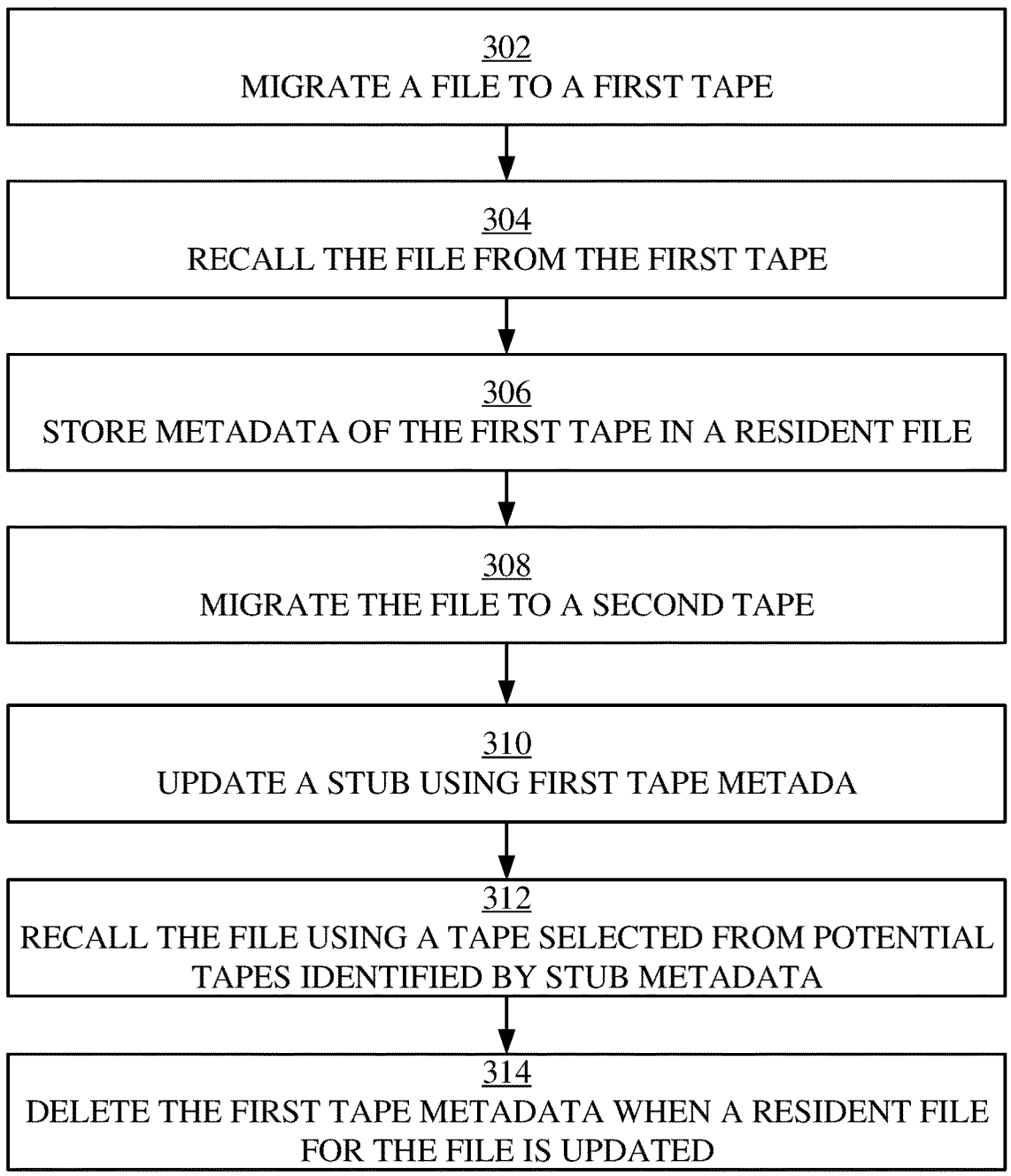
FIG. 3 is a process flow chart of a method for recalling files from tape, in accordance with some embodiments of the present disclosure.

FIG. 3 is a process flow chart of a method 300 for recalling a tape, in accordance with some embodiments of the present disclosure. In some embodiments, an LTFS, such as the LTFS 204 described with respect to FIG. 2, can perform the method 300. In an example, when the application 104, described with respect to FIG. 1, requests the creation of a new file 208, the HSM system 106 may generate a resident file 208-1.

At operation 302, the LTFS 204 may migrate the file 208 to a first tape. As access to the resident file 208-1 decreases, the LTFS 204 may migrate the resident file 208-1. More specifically, the LTFS 204 may select a tape 206 (e.g., the first tape), and copy the resident file 208-1 to a migrated file 208-2. Additionally, the LTFS 204 may create a stub 212, and store the identifier of the first tape in the migrated tape ID 218.

At operation 304, the LTFS 204 may recall the file 208. Some days or months later, the application 104 may attempt to access the file 208. Accordingly, the HSM system 106 may make a request to the LTFS 204 to recall the file 208. When the LTFS 204 is recalling the file 208, the LTFS 204 may read the stub 212 for the file 208, and determine the migrated tape ID 218 of the tape 206 storing the file 208. Further, the LTFS 204 may retrieve the tape 206 and copy the migrated file 208-2 to a new resident file 208-1. Further, to eliminate the association with the first tape, the LTFS 204 may delete the migrated tape ID 218.

At operation 306, the LTFS 204 may store metadata of the first tape in the resident file 208-1. More specifically, the LTFS 204 may store the ID of the first tape as the tape ID 214-1. The LTFS 204 may also store a timestamp indicating when the file 208 was last modified as the MTIME 216-1. As accesses to the file 208 decrease again, the HSM system 106 may request another migration.

At operation 308, the LTFS 204 may migrate the file 208 to a second tape. Accordingly, the LTFS 204 may select a newer generation tape, copy the resident file 208-1 to a new migrated file 208-2, and update the migrated tape ID 218 for the associated stub 212.

At operation 310, the LTFS 204 may update the stub 212 using first tape metadata. More specifically, the LTFS 204 may respectively copy the tape ID 214-1, and MTIME 216-1 from the resident file 208-1 to the previous tape ID 214-2, and previous MTIME 216-2, of the stub 212.

At operation 312, the LTFS 204 may recall the file 208 using a tape selected from potential tapes identified by the stub metadata. When the application 104 again makes a data access request to the file 208, the LTFS 204 may start a recall operation. According to some embodiments of the present disclosure, the LTFS 204 may generate a list of potential tapes to use for the recall. More specifically, the LTFS 204 may read the stub 212 for the file, determine the migrated tape ID 218 (e.g., second tape) and the previous tape ID 214-2 (e.g., first tape), and add the second tape to the list of potential tapes.

As stated previously, the FTIME 210 can represent a timestamp indicating when a tape 206 was formatted. Formatting a tape 206 can involve initiating the tape 206 in a specific storage protocol. However, formatting the tape in this way can make inaccessible all files stored on the tape at the time of the formatting. As such, the file 208 may no longer be accessible, and the LTFS 204 may not include the first tape in the list of potential tapes for the recall. However, if the FTIME is older than the previous MTIME 216-2, the file 208 may still be accessible. Accordingly, the LTFS 204 may add the first tape to the list of potential tapes.

At operation 314, the LTFS 204 may delete the first tape metadata when a resident file 208-1 for the file 208 is updated. For example, the application 104 may make an update to data in the resident file 208-1. As such, the copy of the file on tape (e.g., migrated file 208-2) is no longer current. Hence, the migrated file 208-2 may no longer be valid for a recall. As such, the LTFS 204 may remove the association between the resident file 208-1 and the migrated file 208-2. Thus, the LTFS 204 may delete the previous tape ID 214-2, and previous MTIME 216-2 from the stub 212. In some embodiments of the present disclosure, the LTFS 204 may monitor access to the resident file 208-1 similar to how the LTFS 204 determines a recall-invoking access to migrated files 208-2.

Figure 4A:
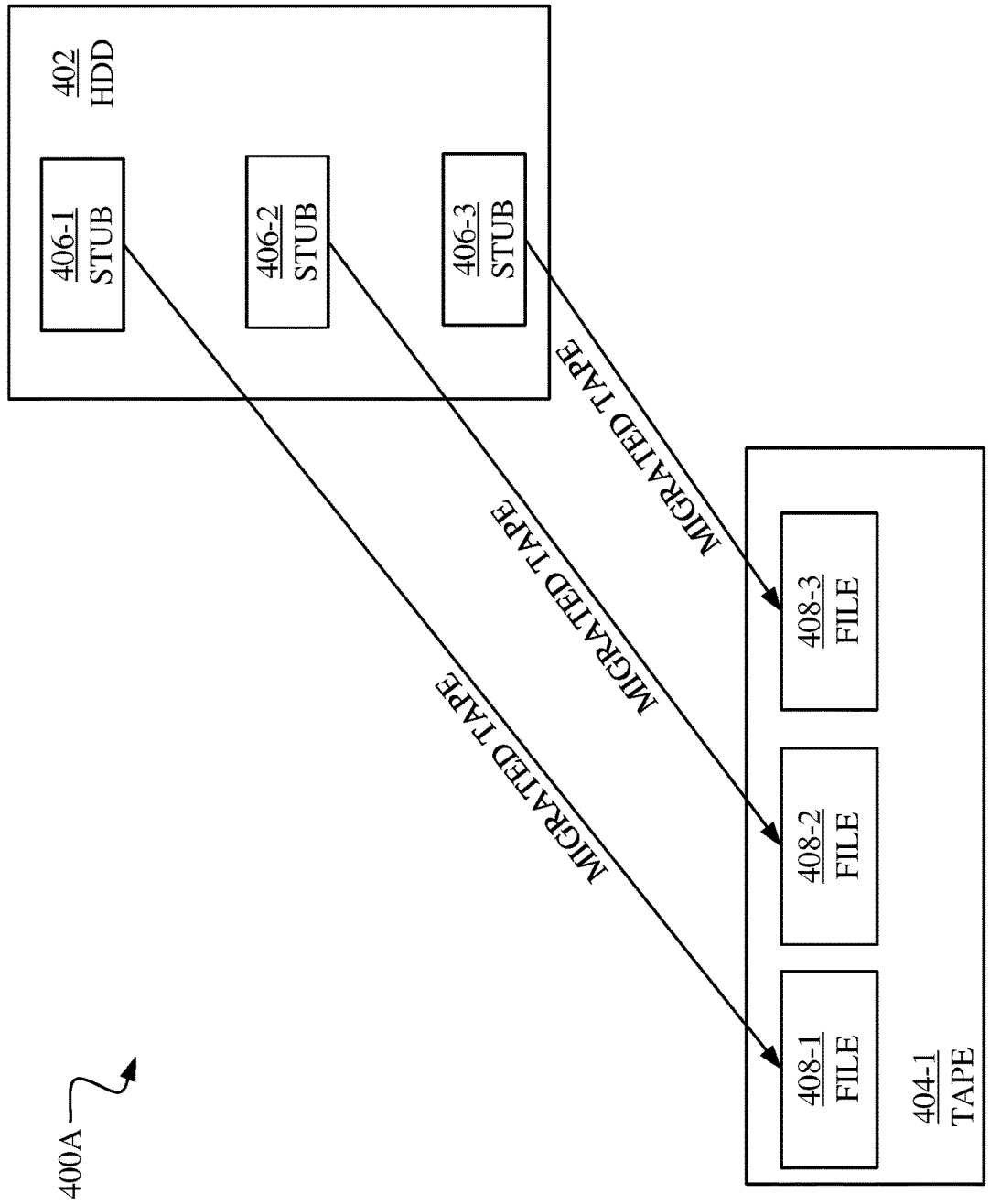
FIG. 4A is a block diagram of an example scenario for recalling a file, in accordance with some embodiments of the present disclosure.

FIG. 4A is a block diagram of an example scenario 400A for recalling a file, in accordance with some embodiments of the present disclosure. Recalling files as described with respect to the method 300 may be useful in scenarios where the selection of multiple potential tapes for recall can reduce the number of tapes involved in the recall of multiple files. The example scenario 400A includes representations of an HDD 402 and tape 404-1. The HDD 402 and tape 404-1 may be similar to the HDD 202 and LTFS 204 described with respect to FIG. 2. Referring back to FIG. 4, the HDD 402 is storing three stubs 406-1, 406-2, 406-3 (collectively referred to as stubs 406). The stubs 406 are similar to the stubs 212. Similarly, the tape 404-1 includes three files 408-1, 408-2, 408-3 (collectively referred to as files 408). The files 408 are similar to the migrated files 208. The example scenario 400A has a line pointing from each of the stubs 406 to the files 408. As stated previously, the stubs 406 can include metadata (e.g., migrated tape ID 218) that identifies where the file 408 has been migrated. Accordingly, the lines point from the stubs 406 to the files 408 on the tape 408-1 where the stub's metadata indicates the associated file 408 is stored. In the example scenario 400A, files 408 are stored on one tape, i.e., tape 404-1.

Figure 4B:
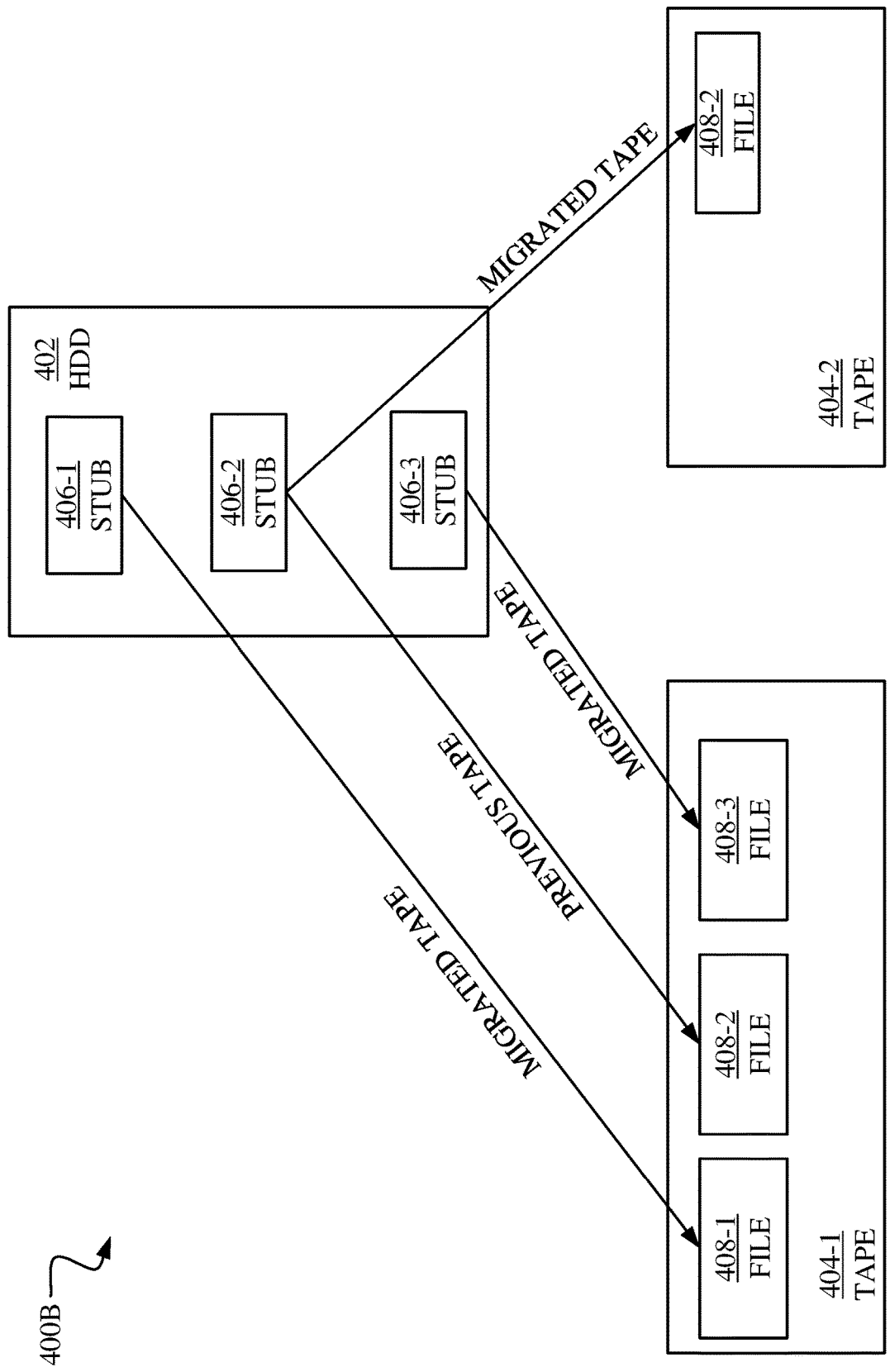
FIG. 4B is a block diagram of an example scenario for recalling a file, in accordance with some embodiments of the present disclosure.

FIG. 4B is a block diagram of an example scenario 400B for recalling a file, in accordance with some embodiments of the present disclosure. In the example 400B, the file 408-2 has been recalled and migrated to tape 404-2, as described with respect to the method 300. Accordingly, the migrated tape information for stubs 406-1, 406-3 still point to files 408-1, 408-3. However, migrated tape information for the stub 406-2 now points to the file 408-2 on tape 404-2, and the previous tape information for the stub 406-2 now points to the copy of the file 408-2 on tape 404-1. As such, on the occasion of a recall of file 408-1, 408-2, and 408-3, the LTFS 204 can recall the three files 408 from one tape, i.e., tape 404-1. This provides an advantage over current systems, which eliminate the association with the file 408-2 on tape 404-1, and thus implicate an additional tape mount, to read file 408-2 from tape 404-2.

Figure 5:
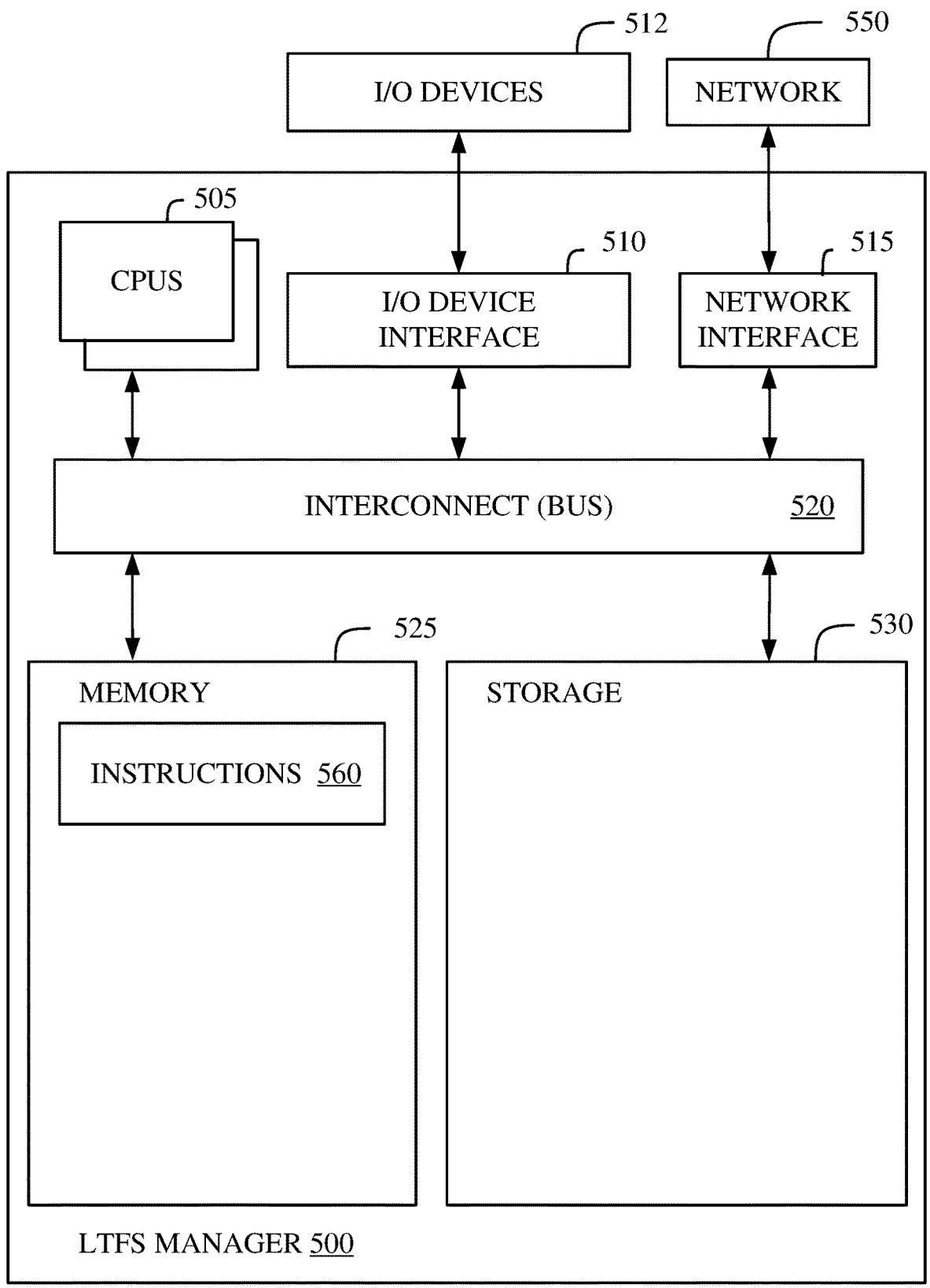
FIG. 5 is a block diagram of an example LTFS manager, in accordance with some embodiments of the present disclosure.

FIG. 5 is a block diagram of an example LTFS manager 500, in accordance with some embodiments of the present disclosure. In various embodiments, the LTFS manager 500 is similar to the LTFS 110 and can perform the method described in FIG. 3 and/or the functionality discussed in FIGS. 1, 2, and 4A-4B. In some embodiments, the LTFS manager 500 provides instructions for the aforementioned methods and/or functionalities to a client machine such that the client machine executes the method, or a portion of the method, based on the instructions provided by the LTFS manager 500. In some embodiments, the LTFS manager 500 comprises software executing on hardware incorporated into a plurality of devices.

The LTFS manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the LTFS manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all of the method described in FIG. 3 and/or the functionality discussed in FIGS. 1, 2, and 4A-4B.

In various embodiments, the I/O devices 512 include an interface capable of presenting information and receiving input. For example, I/O devices 512 can present information to a listener interacting with LTFS manager 500 and receive input from the listener.

The LTFS manager 500 is connected to the network 550 via the network interface 515. Network 550 can comprise a physical, wireless, cellular, or different network.

In some embodiments, the LTFS manager 500 can be a multi-user mainframe computer system, a single-user system, or a server computer or similar device that has little or no direct user interface but receives requests from other computer systems (clients). Further, in some embodiments, the LTFS manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary LTFS manager 500. In some embodiments, however, individual components can have greater or lesser complexity than as represented in FIG. 5, components other than or in addition to those shown in FIG. 5 can be present, and the number, type, and configuration of such components can vary.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system comprising:
a computer processing circuit; and
a computer-readable storage medium storing instructions, which, when executed by the computer processing circuit, are configured to cause the computer processing circuit to perform a method comprising:

migrating a file to a newer tape, wherein the file is previously recalled by a linear tape file system (LTFS) from an older tape;
updating a stub for the file with metadata describing the newer tape, the older tape, and the file;
recalling the file using a tape selected from a plurality of potential tapes identified by the metadata;
determining that a formatted time of the older tape is newer than a modified time of the file on the older tape; and
deleting, from the stub:
an identifier (ID) of the older tape; and
the modified time of the file on the older tape.

2. The system of claim 1, wherein the metadata describing the newer tape, the older tape, and the file comprises:
the ID of the older tape; and
the modified time of the file on the older tape.

3. The system of claim 2, the method further comprising:
determining that the formatted time of the older tape is older than the modified time of the file on the older tape; and
adding the older tape to a list of potential tapes for recalling the file.

4. The system of claim 3, the method further comprising:
recalling a plurality of tapes comprising the file;
determining that selecting the older tape for recalling the file reduces a number of tape mounts for recalling a plurality of files; and
selecting the older tape based on the determination.

5. The system of claim 3, wherein the list of potential tapes comprises the newer tape and the older tape.

6. The system of claim 1, the method further comprising:
determining that an application has updated the file in a resident state; and
deleting, from the stub:
the ID of the older tape; and
the modified time of the file on the older tape.

7. A method comprising:
migrating a file to a newer tape, wherein the file is previously recalled by a linear tape file system (LTFS) from an older tape;
updating a stub for the file with metadata describing the newer tape, the older tape, and the file;
recalling the file using a tape selected from a plurality of potential tapes identified by the metadata;
determining that a formatted time of the older tape is newer than a modified time of the file on the older tape; and
deleting, from the stub:
the identifier (ID) of the older tape; and
the modified time of the file on the older tape.

8. The method of claim 7, wherein the metadata describing the newer tape, the older tape, and the file comprises:
the ID of the older tape; and
the modified time of the file on the older tape.

9. The method of claim 8, further comprising:
determining that a formatted time of the older tape is older than the modified time of the file on the older tape; and
adding the older tape to a list of potential tapes for recalling the file.

10. The method of claim 9, the method further comprising:
recalling a plurality of files comprising the file;
determining that selecting the older tape for recalling the file reduces a number of tape mounts for recalling the plurality of files; and
selecting the older tape based on the determination.

11. The method of claim 9, wherein the list of potential tapes comprises the newer tape and the older tape.

12. The method of claim 7, further comprising:
determining that an application has updated the file in a resident state; and
deleting, from the stub:
the ID of the older tape; and
the modified time of the file on the older tape.

13. A computer program product comprising one or more computer readable storage media, and program instructions collectively stored on the one or more computer readable storage media, the program instructions comprising instructions configured to cause one or more processors to perform a method comprising:
migrating a file to a newer tape, wherein the file is previously recalled by a linear tape file system (LTFS) from an older tape;
updating a stub for the file with metadata describing the newer tape, the older tape, and the file;
determining that a formatted time of the older tape is older than a modified time of the file on the older tape;
adding the older tape to a list of potential tapes for recalling the file; and
recalling the file using a tape selected from a plurality of potential tapes identified by the metadata.

14. The computer program product of claim 13, wherein the metadata describing the newer tape, the older tape, and the file comprises:
an identifier (ID) of the older tape; and
the modified time of the file on the older tape.

15. The computer program product of claim 13, the method further comprising:
recalling a plurality of files comprising the file;
determining that selecting the older tape for recalling the file reduces a number of tape mounts for recalling the plurality of files; and
selecting the older tape based on the determination.

16. The computer program product of claim 13, wherein the list of potential tapes comprises the newer tape and the older tape.

17. The computer program product of claim 13, the method further comprising:
determining that an application has updated the file in a resident state; and
deleting, from the stub:
the ID of the older tape; and
the modified time of the file on the older tape.

18. The computer program product of claim 13, the method further comprising:
determining that the formatted time of the older tape is newer than the modified time of the file on the older tape; and
deleting, from the stub:
the ID of the older tape; and
the modified time of the file on the older tape.

* * * * *